Dec. 21, 1948.   J. A. HARINGX   2,456,702
FILM DRIVING APPARATUS
Filed April 29, 1946
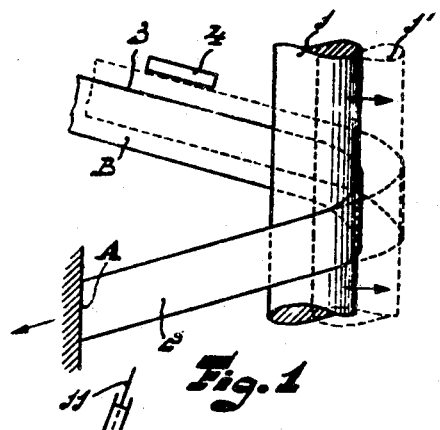
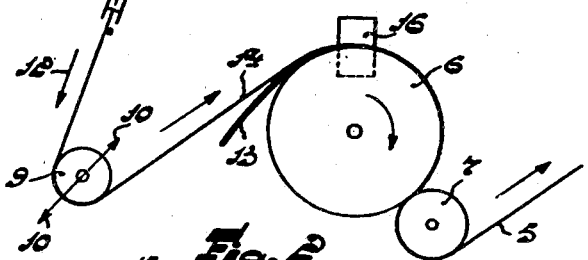
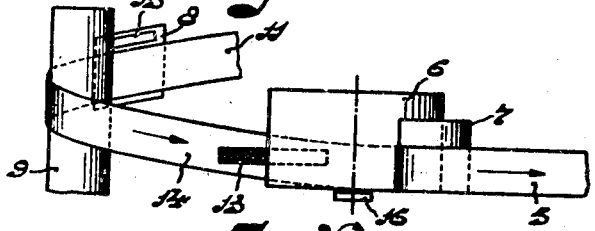
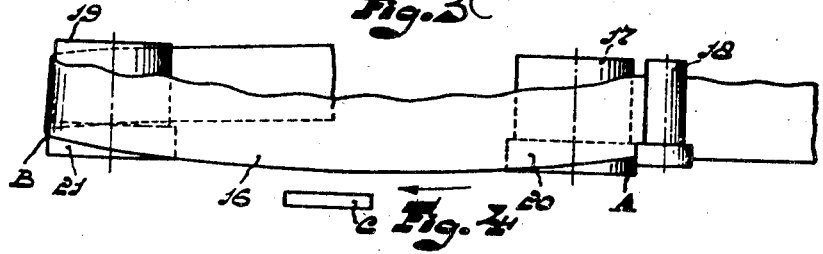
INVENTOR
JOHANNES ADRIANUS HERINGX
BY *[signature]*
ATTORNEY

Patented Dec. 21, 1948

2,456,702

UNITED STATES PATENT OFFICE 2,456,702

FILM DRIVING APPARATUS

Johannes Adrianus Haringx, Eindhoven, Netherlands, assignor to Hartford National Bank and Trust Company, Hartford, Conn., as trustee Application April 29, 1946, Serial No. 665,667
In Belgium February 9, 1945

Section 1, Public Law 690, August 8, 1946
Patent expires February 9, 1965

6 Claims. (Cl. 88—18.6)

This invention relates to a device for moving and guiding thin bands, for instance films that are made from entirely or partly regenerated cellulose and which may comprise image and/or sound records. In moving such bands having a thickness of several times ten microns, a serious problem arises in guiding the band, since the conventional expedients for this purpose used with bands having a greater thickness, for instance image and/or sound films made from celluloid, which expedients comprise rollers having integral flanges, stationary flanges adjacent the rollers, or other resilient guiding members between which the band travels, have proved to be unsuitable. In fact, thin band-shaped material having the above-mentioned thickness does not respond to conventional guiding so that damaging and even fracture is unavoidable, notably in the case of the material being moist, which often occurs in processing.

The invention has for its object to avoid this drawback. To this end the device according to the invention comprises one or more stationary or rotating guiding and/or driving members engaging the band helicoidally at a small pitch, at least so long as a fixed stop provided in the vicinity of the said members at one side of the band, and is engaged by the band of its own accord during its travel, is not reached. In the present case the expression "of its own accord" is to be understood to mean that the stop is engaged without an external force, e. g. by means of a resilient member, pushing on the other side of the band. Damaging of the band is not to be feared, since the force exerted by the stop on the side of the band can be kept very small, both in regard to its value and duration, by a suitable choice of the incline of the helical line and the location of the stop. In practice this incline may, for instance, be of the order of magnitude of one or more hundredths of a millimeter.

The principle underlying the invention will be explained with reference to the accompanying drawing, forming a part of the specification in which:

Fig. 1 is a schematic diagram illustrating the underlying principle of the invention, Fig. 2 is a schematic diagram of a device according to the invention, Fig. 3 is a schematic diagram of a side view of the device illustrated in Fig. 2, and Fig. 4 is a side view of another embodiment of the device according to the invention.

In Figure 1 the case is considered where the guiding member exclusively performs a translation movement. The reference numeral 1 denotes a cylindrical guiding member about which the band 2 is helically curved. Assuming that the band is fixed by any conventional means at the end A, the end B of the band, upon the cylinder 1 moving to the right, will move not only in a longitudinal direction but also upwards till the side 3 engages the fixed stop 4 (position 1' of the cylinder). Of course, the same effect is obtained if the end A is not fixed but is moved simultaneously with the movement of the cylinder 1 in a longitudinal direction of the band according to the arrow. It is only necessary to take care that the end A is substantially stationary in a lateral direction.

The device according to the invention is very suitable for use in intermittently impelling a picture film in front of the picture gate by means of a plunger movement by which a loop provided in the continuously driven film is caused to change its length periodically, as a result of which the film is moved by one frame at a time in front of the picture gate. In such a device, according to the invention, the aforesaid guiding member constitutes the striking member of the plunger movement, the helical form being obtained by making the band extend from a point, more or less fixed in a lateral direction of the band, on the driving roller located in the film path behind the plunger movement, obliquely with respect to the axis of the roller. This film portion in situ may be compared, as will appear hereinafter, with the end A in Figure 1. The stop engaged by the film during its travel is provided in situ or in the proximity of the picture gate located before the plunger movement.

Figures 2 and 3 represent diagrammatically one form of construction of the aforesaid device.

In Figure 2 the reference numeral 5 denotes the film suitable for recording or reproducing images and which may be with or without accompanying sound recordings. It is assumed that in the present case a slack film having a thickness of about 40 microns is used. By the smooth roller 6 engaged by the film by means of a press roller 7, the film is driven in the direction of the arrow. In the film path between the roller 6 and the picture gate 8 is placed the plunger movement whose striking member 9 is represented diagrammatically as a cylinder. The striking member, which corresponds to the guiding member 1 shown in Fig. 1, is moved to and fro according to the arrows 10. In the position shown in the drawing the loop in the film has just been enlarged due to its downward movement, as a result of which the part 11 of the film is displaced by one image in the direction of the arrow 12. As is known the roller 6 upon the return of the striking member 9, provides that the loop is reduced again while the film is at a standstill in the picture gate.

The invention is illustrated in Figure 3 which is a side view of Fig. 2. At the striking member the film is helically curved. To obtain this form and to retain it in moving the film the latter is compelled slightly to change its direction at the driving roller 6. As shown in the drawing this may, for instance, take place by means of a piece of felt 13 provided at one side of the film between the latter and the driving roller. In this way the radius of the roller is slightly increased artificially in situ and, with the same arc length on either side of the film, the distance between the ends of the arc at one side of the film is smaller than at the other side, with the result that the film in situ exhibits a knee as it were. The consequent incline of the film part 14 depends inter alia upon the length of the piece of felt between roller and film. Of course, this length can be made adjustable in a simple manner.

The operation of the device shown in Figures 2 and 3 is explained with reference to Figure 1. Upon an enlargement of the loop by the member 9 the film part 11 will move both in a longitudinal direction and in a lateral direction and thus engage the fixed stop 15 provided at the picture gate 8. Since this guiding by the stop has to take place each time only at the moment the image is at rest in the gate, the location of this stop with a definite angle of the film, or conversely, will generally be so chosen that the stop is not reached before the end of the periodical displacement of the film in front of the picture gate. In this way the risk of damaging of the edge of the film is reduced to a minimum.

The piece of felt 13 may be used at the same time to guide the film by a stop 16 provided along the film, since due to the location of the piece of felt there is an asymmetrical driving relatively to the longitudinal direction of the film, due to which the film in situ tends to move downwards.

Of course, the means for obtaining the helical form of the film is not bound to the use of the piece of felt or other material. For instance, the same effect may be obtained by giving the axis of the cylinder 9 an oblique position with respect to the axis of the roller 6. In this case it is not necessary for the film to change its direction at the roller.

If the guiding member 1 shown in Figure 1 does not perform a translation but a rotation, there results a form of construction which may be used for continuously moving sound films in front of the sound gate for recording or reproducing sounds. In such a device, according to the invention, rollers are provided on either side of the gate, the band being carried off from a point of one of the rollers which is more or less fixed in a lateral direction of the band, and the two rollers being so shaped and/or positioned that the band between them is stretched at one side and in moving on engages with this side of its own accord a fixed stop at the sound gate. For carrying into effect the idea underlying the invention, the shape and/or the positioning of the rollers should be such that the film helically engages the roller receiving the band, so long as the stop is not reached. This is possible, for instance, by making use of rollers having smooth cylindrical surfaces and which are provided at one end with a flange-shaped thickening, owing to which the diameter is slightly increased locally, and whose axes extend parallel with each other. As an alternative conical rollers may be used. Furthermore it is not necessary for the two rollers to have the same shape. For instance, one roller may be furnished with a thickening and the other may be designed as a smooth cylindrical roller. By such expedients it can be achieved that one side of the film is stretched and the film, due to this bending out of its plane, is supplied to one of the two rollers at a small incline relatively to the axis thereof. Due to this the film tends to shift in a lateral direction during its travel. This effect may be utilized to place a fixed stop along the film portion between the two rollers at or near the sound gate, as a result of which the strip for the sound track is fixed in a lateral direction relatively to the sound gate, the film during its travel being guided with such a small force as to prevent damaging. The invention is of particular importance notably for recording or reproducing sound on slack bands of regenerated cellulose.

In Fig. 4 the means for guiding the film are represented diagrammatically, it being assumed that the film 16 is travelling in the direction of the arrow. At A the film leaves the driving roller 17 against which it is pressed by the push roller 18. Furthermore the film is conveyed to the reeling spool over an idle roller 19 which in the case under view has the same shape as the roller 17. Both rollers exhibit at the bottom side a flange-shaped widening 20 and 21 respectively so that at this point the diameter is slightly larger, for instance some few tenths of a millimeter. As appears from the drawing the film is guided over the flanges only at the bottom side, owing to which the bottom side of the film is stretched to a greater or less degree, in contradistinction to the upper side which retains its initial length as a rule and is usually a little wrinkled. As an alternative, the upper side may exactly be kept taut by a suitable choice of the difference in diameter at the upper and bottom side of the rollers. In this case it is advantageous to use conical rollers.

The aforesaid expendients result in the film being slightly curved downward, as appears from the drawing, owing to which the film at B is supplied at a small angle to the roller 19 and engages this roller helically. Since the roller follows the rotation the film will move downward. If by a suitable guiding of the film care is taken that at the roller 17 the bottom side of the film cannot shift in the direction of the axis of the roller, the point A may be considered as a fixed point, and the aforesaid displacement of the point B will result in that the film engages of its own accord the stop C at the sound gate, thus ensuring the required guiding at this point.

Of course, the film may be suitable at the same time for recording or reproducing images and the device referred to, if it is suitable at the same time for such a recording or reproduction, will preferably also be equipped with the aforesaid means for guiding picture films.

What I claim is:

1. A device for moving and guiding a thin band-shaped carrier having a thickness of the order of tens of microns, comprising a film handling member having a longitudinal axis and having a surface extending in the direction of said axis and about which said carrier is positioned, means to continuously maintain said carrier positioned on said handling member at an angle departing from the normal to said axis to thereby helicoidally arrange said carrier on said handling member at all times during the operation of this device, and a stop member positioned in displaced relationship from said handling member along the path of said carrier to said handling member and adjacent one edge of said carrier to limit lateral movement of the carrier along the said axis of the handling member.

2. A device for moving and guiding a thin band-shaped carrier having a thickness of the order of tens of microns, comprising a cylindrical film handling member about which said carrier is positioned, means to continuously maintain said carrier positioned on said handling member at an angle departing from the normal to the axis of said handling member to thereby helicoidally arrange said carrier on said handling member at all times during the operation of the device, and a stop member positioned in displaced relationship from said handling member along the path of said carrier to said handling member and adjacent one edge of said carrier to limit lateral movement of the carrier along the axis of said handling member.

3. A device for moving and guiding a thin band-shaped carrier having a thickness of the order of tens of microns, comprising a cylindrical film handling member about which said carrier is positioned, means to drive said carrier, a picture gate positioned in displaced relationship from said handling member along the path of said carrier to said handling member and arranged adjacent said carrier, a stop member arranged on said gate and positioned adjacent one edge of said carrier to limit lateral movement of the carrier along the said axis of the handling member, means to oscillate said handling member to move said carrier in front of said gate in an intermittent manner, and means to continuously maintain said carrier positioned on said handling member at an angle departing from the normal to said axis to thereby helicoidally arrange said carrier on said handling member at all times during the operation of the device.

4. A device for moving and guiding a thin band-shaped carrier having a thickness of the order of tens of microns, comprising a cylindrical film handling member about which said carrier is positioned, means comprising a drive roller to drive said carrier, a picture gate positioned in displaced relationship from said handling member along the path of said carrier to said handling member and arranged adjacent said carrier, a stop member arranged on said gate and positioned adjacent one edge of said carrier to limit lateral movement of the carrier along the said axis of the handling member, means to oscillate said handling member to move said carrier in front of said gate in an intermittent manner, and means comprising a flange member at the end of said drive roller over which said carrier is arranged to continuously maintain said carrier positioned on said handling member at an angle departing from the normal to said axis to thereby helicoidally arrange said carrier on said handling member at all times during the operation of the device.

5. A device for moving and guiding a thin band-shaped carrier having a thickness of the order of tens of microns, comprising a cylindrical film handling member about which said carrier is positioned, and provided with a flange at one end, means comprising a driving roller to drive said carrier, a picture gate positioned in displaced relationship from said handling member along the path of said carrier to said handling member and arranged adjacent said carrier, a stop member arranged on said gate and positioned adjacent one edge of said carrier to limit lateral movement of the carrier along the said axis of the handling member, means to oscillate said handling member to move said carrier in front of said gate in an intermittent manner, and means comprising a flange at one end of said driving roller over which said carrier is arranged to continuously maintain said carrier positioned on said handling member at an angle departing from the normal to said axis to thereby helicoidally arrange said carrier on said handling member at all times during the operation of the device.

6. A device for moving and guiding a thin band-shaped carrier having a thickness of the order of tens of microns, comprising a frustro-conical film handling member about which said carrier is positioned, a picture gate positioned in displaced relationship from said handling member along the path of said carrier to said handling member and arranged adjacent said carrier, a stop member arranged on said gate and positioned adjacent one edge of said carrier to limit lateral movement of the carrier along the said axis of the handling member, means to oscillate said handling member to move said carrier in front of said gate in an intermittent manner, and a frustro-conical driving roller to drive said carrier and to continuously maintain said carrier positioned on said handling member at an angle departing from the normal to said axis to thereby helicoidally arrange said carrier on said handling member at all times during the operation of the device.

JOHANNES ADRIANUS HARINGX.

REFERENCES CITED

The following references are of record in the file of this patent:

UNITED STATES PATENTS

| Number | Name | Date |
| --- | --- | --- |
| 1,328,382 | Lockhart et al. | Jan. 20, 1920 |
| 1,771,922 | Heisler | July 29, 1930 |
| 1,906,186 | De Ville | Apr. 25, 1933 |
| 2,012,130 | Kellogg | Aug. 20, 1935 |
| 2,092,177 | McClay | Sept. 7, 1937 |
| 2,102,895 | Hasbrouck, Jr. | Dec. 21, 1937 |
| 2,105,698 | Nissen | Jan. 18, 1938 |